United States Patent
Racz

[15] 3,687,331
[45] Aug. 29, 1972

[54] COOK WARE CONTAINER COVER

[72] Inventor: Nick S. Racz, 4800 Chicago Beach Dr., Chicago, Ill. 60615

[22] Filed: April 1, 1970

[21] Appl. No.: 24,650

[52] U.S. Cl. .............................................. 220/42
[51] Int. Cl. ........................................... B65d 41/00
[58] Field of Search .................... 220/42 A, 24, 9

[56] References Cited

UNITED STATES PATENTS 1,935,653   11/1933   Miller ...................... 220/42 A
2,350,950   6/1944   Willey ...................... 220/42 A

*Primary Examiner*—George T. Hall
*Attorney*—Molinare, Allegretti, Newitt & Witcoff

[57] ABSTRACT

In a cookware container, the cover closes the open top of the heating vessel and extends downward in overlying relationship to a substantial area of the sidewall of the vessel, the portion of the cover which overlies the wall being formed of an insulative material having a thermal conductivity substantially less than the vessel sidewall to reduce heat losses through the wall.

7 Claims, 3 Drawing Figures

PATENTED AUG 29 1972　　3,687,331
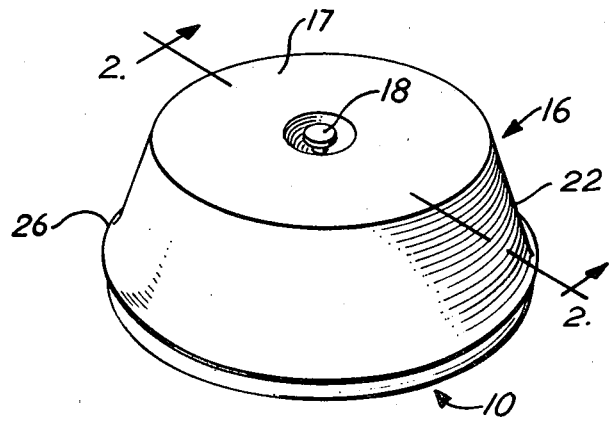
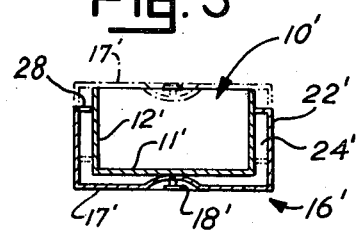
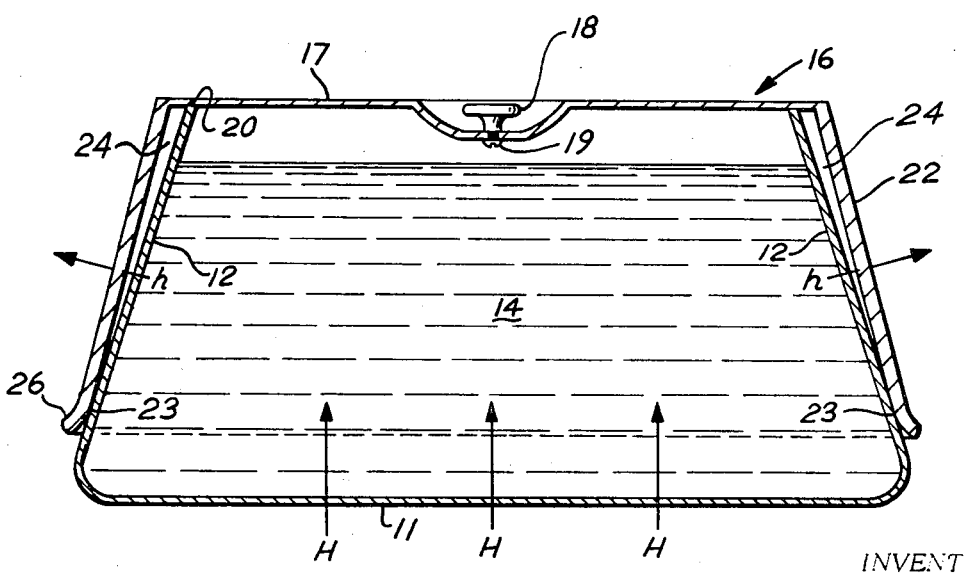
INVENTOR.
NICK S. RACZ
BY Molinare, Allegretti, Newitt & Witcoff
ATTORNEYS

COOKWARE CONTAINER COVER

BACKGROUND AND SUMMARY OF THE INVENTION

This invention relates to a cookware container cover and, more particularly, to cover for a cookware container which substantially reduces heat loss through the walls of the container.

Cookware containers or vessels are frequently constructed of materials which have a high thermal conductivity in order to optimize heat transfer from the heat source to the materials which are to be cooked in the container. Such thermal conductivity is advantageous in those walls of the container which are to be positioned directly between the heat source and the food, such as the bottom wall of a container which is to be employed on an open top range. However, the thermally conductive materials from which the container is formed which optimize heat transfer from the heat source to the food also have the disadvantage of allowing the transfer of heat or heat loss from the food through the walls of the container which are not exposed to or in contact with the heat source. This loss of heat through the unheated surface of the container is disadvantageous primarily for two reasons. First, it results in slower cooking of the food contents of the container than would be the case if there were no such losses. Second, in order to keep the food at the necessary temperature while cooking and/or while awaiting serving, a higher energy input is required than would otherwise be needed if these losses were eliminated. The excessive use of heat energy necessitated by these disadvantageous heat losses through the unheated container surfaces results in higher costs of utilities to the user of the container.

In the invention, the otherwise conductive walls of the container which are not exposed to or in contact with the heat source are insulated against heat losses therethrough by the cover. In the invention, a cover for the container is provided which functions not only to provide a closure for the open top of the container, but also to insulate the sidewalls of the container thereby substantially reducing heat transfer and loss. The insulative cover of the invention is also easily and rapidly positioned on and removed from the container. In addition, the insulative cover may serve as a support for the container when food is to be served in the same container in which it was prepared. This is particularly advantageous since the insulative properties of the closure will protect the surface upon which the container rests from possible heat damage in the event hot food is being served, while maintaining the container contents warm during serving.

In a principal aspect of the invention, a cookware container includes an open top vessel having bottom and sidewalls and a cover is provided for the vessel which includes a closure portion for closing the open top of the vessel and a wall which is attached and depends downward from the closure portion in overlying relationship to a substantial part of the area of he sidewall of the vessel. This cover wall has a thermal conductivity which is substantially less than the thermal conductivity of the sidewall of the vessel, the former acting to insulate the sidewall of the vessel and substantially reducing heat transfer therethrough.

These and other objects, features and advantages of the present invention will be more clearly understood after considering the following detailed description.

BRIEF DESCRIPTION OF THE DRAWING

In the course of this description, reference will frequently be made to the attached drawing in which:

FIG. 1 is a perspective view of one preferred embodiment of cookware container and cover incorporating the principles of the invention;

FIG. 2 is a cross sectioned elevation view of the container and cover taken substantially along line 2 — 2 of FIG. 1; and FIG 3 is a cross sectioned elevation view of another embodiment of container and cover incorporating the principles of the invention.

DESCRIPTION OF THE PREFERRED EMBODIMENTS

A preferred embodiment of a cookware container and cover which incorporate the principles of the invention includes a cooking vessel 10 which is formed of a thermally conductive material as shown in FIGS. 1 and 2. Such materials may include aluminum steel alloys thereof, and the like. The vessel includes a bottom wall 11 which is adapted to rest upon the heat source (not shown), such as a burner or heating element of a range. Extending upward from the bottom wall 11 is an upstanding sidewall 12 which is preferably formed integral with the bottom wall to form a container having an open top.

In use, the food contents 14 which are desired to be heated in the vessel 10 are introduced into the vessel through its open top and the vessel is placed on the heating element of a suitable heat source, such as a gas or electric range, charcoal fire, etc. Since the vessel is formed of a thermally conductive material, heat transfer from the heat source to the material in the container readily takes place, as indicated by arrows H, so as to elevate the temperature of the container contents to cook them. However, since the sidewall 12 of the container is also thermally conductive, a certain amount of heat $h$, which has been transferred to the vessel itself and to the contents in the container, is lost through that major area of the sidewall of the container which is not exposed to or in contact with the heat source. Such heat loss is both undesirable from the aspect of wasted heat energy and in the increase in the amount of time required to cook the container contents.

In the preferred embodiment of the invention, a cover 16 is provided as a closure for the open top of the vessel. The cover 16 not only serves the useful conventional function as a closure, but in addition substantially reduces this undesirable heat loss through the side of the vessel.

The preferred cover 16 of the invention, comprises a closure portion 17 which overlies the open top of the vessel 10. A suitable knob or handle 18 may be attached to the closure portion 17 for handling by way of a screw 19 or the like. The closure portion 17 is preferably somewhat larger than the top opening of the vessel so as to overhang the upper rim 20 of the vessel. A cover wall 22 depends downward from the perimeter of the closure portion 17, the wall 22 being attached to the overhang of the closure portion 17 and overlying a substantial part of that part of the sidewall exterior area which is not directly exposed to the heat source. Unlike the composition of the vessel 10, the cover wall 22 is formed of a material which is highly insulative in nature, such as any one of various heat resistant polymeric resinous materials. Since the cover wall is insulative, the rate of heat transfer $h$ from the food through the sidewall 12 of the vessel which it overlies is substantially reduced.

Preferably, the sidewall 12 of the vessel and the cover wall 22 of the cover 16 are inclined at different angles, the cover touching the upstanding sidewall 12 of the container at only two points, the first being the upper rim 20 of the container, and the second being in the lower region of the upstanding sidewall at 23. The differential incline of the walls 12 and 22 not only facilitates the ready positioning of the cover on the vessel but also provides an air space 24 between the upper part of the sidewall and the upper part of the cover wall which substantially enhances the insulative properties of the cover in this region, to further reduce the heat loss $h$ in this area.

In addition, the lowermost portion of the cover wall 22 may be flared somewhat at 26 so as to have a maximum internal diameter somewhat greater than the maximum outside diameter of the container which will provide a stable rest for the container if the cover is inverted for use as a support for the container, for example during serving of the food. When the cover is also utilized as a support, the insulative properties of the cover will protect against damage to wood, cloth, paper or other surfaces upon which the hot container rests which might otherwise be susceptible to heat damage from the hot container. Where the cover 16 is to be utilized as a support, the handle is preferably recessed as shown to provide a stable base.

Referring to FIG. 3, a vertical container wall and cover wall embodiment is shown in which the wall 12' of the container 10' extends substantially normal to the bottom wall 11' and the sidewall 22' of the cover 16' extends substantially normal to the closure 17'. In this embodiment the sidewalls 22' of the cover not only insulate the sidewall 12' of the container against heat loss during cooking when the cover is used as a closure as shown in the dot and dash lines, but also reduces heat loss when the cover is utilized as a support in the position shown by the solid lines in FIG. 3. In addition, the rim of the cover 16' may be provided with an annular flange 28 so as to space the cover wall somewhat from the container wall to form an insulative air space 24' as previously described.

It will be appreciated that the cover 16 or 16', either in part or in total, may be formed of a material differing from the highly conductive composition of the vessel 10 or 10'. For example, the closure portion 17 and wall 20 of cover 16 may be moulded of the same insulative materials in a one piece construction, or the closure portion and wall may be formed of different materials and joined together, if desired.

It should be understood that the embodiments of the invention which have been described are merely illustrative of a few of the applications of the principles of the invention. Numerous modifications may be made by those skilled in the art without departing from the true spirit and scope of the invention.

What is claimed is

1. In a cookware container including an open topped vessel formed of a heat conductive material and having a bottom wall adapted to introduce heat from a heat source into the vessel and an upstanding sidewall, wherein the improvement comprises in combination therewith:

a cover for said vessel having a closure portion overlying the open top of said vessel for closing same and a wall attached to and depending downward from said closure portion in overlying relationship to a substantial part of the area of the sidewall of the vessel, said cover wall having a thermal conductivity which is substantially less than the thermal conductivity of the sidewall of the vessel.

2. In the container of claim 1, wherein said cover wall overlies the exterior side of said sidewall.

3. In the container of claim 1, wherein said cover wall and said sidewall are spaced from each other to form an insulative space there-between.

4. In the container of claim 3 wherein the sidewall of said vessel is disposed at an angle to said cover wall so as to form an air space therebetween.

5. In the container of claim 1 wherein said sidewall is disposed at an angle of less than 90° with said bottom wall.

6. In the container of claim 1 wherein the maximum diameter of said cover wall is greater than the maximum diameter of said sidewall, whereby the vessel may be supported on said cover.

7. In the container of claim 6 wherein said cover wall is flared to form said maximum diameter.

* * * * *